US007576768B2

(12) United States Patent
Sukenari (10) Patent No.: US 7,576,768 B2
(45) Date of Patent: Aug. 18, 2009

(54) IMAGING APPARATUS

(75) Inventor: Kazuhiro Sukenari, Nagoya (JP)

(73) Assignee: Elmo Company, Limited (JP)

( * ) Notice: Subject to any disclaimer, the term of this patent is extended or adjusted under 35 U.S.C. 154(b) by 1050 days.

(21) Appl. No.: 10/866,215

(22) Filed: Jun. 10, 2004

(65) Prior Publication Data

US 2005/0157167 A1    Jul. 21, 2005

(30) Foreign Application Priority Data

Jan. 15, 2004    (JP)    ............... 2004-007616

(51) Int. Cl.
*H04N 7/18*    (2006.01)
(52) U.S. Cl. ........................................ 348/61
(58) Field of Classification Search ............ 348/61–141
See application file for complete search history.

(56) References Cited

U.S. PATENT DOCUMENTS 6,064,426 A  *  5/2000  Waterman .................... 348/63
6,067,112 A  *  5/2000  Wellner et al. ........... 348/211.4
6,300,975 B1  * 10/2001  Yamane ....................... 348/63
6,791,600 B1  *  9/2004  Chan ........................... 348/63
7,372,503 B2  *  5/2008  Maeda et al. ............... 348/376

FOREIGN PATENT DOCUMENTS

| JP | 11-174598 | 7/1999 |
| JP | 11-187214 | 7/1999 |
| JP | 11-234557 | 8/1999 |
| JP | 2003-209717 | 7/2003 |

* cited by examiner

*Primary Examiner*—Andy S Rao
(74) *Attorney, Agent, or Firm*—Ostrolenk Faber LLP (57) ABSTRACT

An imaging apparatus includes an arm unit that is configured to be inclinable to a table. The imaging apparatus varies the extent of inclination to change an imaging attitude of the video camera between a faraway imaging attitude that is most distant from the table surface and a nearby imaging attitude that is most close to the table surface. When the imaging attitude of the video camera is changed as above, an illumination link mechanism in the imaging apparatus causes a swing motion of a first group of illumination LED and changes a spot to be illuminated by the first group of illumination LED in compliance with the change of the imaging location of the video camera, which changes the imaging attitude.

3 Claims, 7 Drawing Sheets

IMAGING APPARATUS

BACKGROUND OF THE INVENTION

The present invention relates to an imaging apparatus. In particular, the present invention relates to an imaging apparatus that has a table on which an imaging target is mounted and a video camera that picks up images in a direction toward the table.

DESCRIPTION OF THE RELATED ART

Imaging apparatus such as material representation tables are conventionally known, which incorporate video cameras to pick up and display materials onto TV monitors or the like. Such an imaging apparatus includes a table on which a material is mounted, which is for ease of picking up images of documents and photographs, and uses a supporting post to support a video camera in a direction toward the table. The supporting post is configured to be foldable or extendable for ease of storage and carriage.

In recent years, various techniques have been proposed to improve portability of such an imaging apparatus (see Japanese Patent Laid-open Gazette No. 2003-209717 "Patent Document 1", for example).

The above-mentioned imaging apparatus generally includes an illumination unit attached thereto to provide for light for picking up images. In a device disclosed in the Patent Document 1, for example, an illumination unit is attached to a supporting pole and emits light from behind a table.

In the device disclosed in the Patent Document 1, an imaging location of a video camera varies back and forth on a table surface, and when the imaging location is on the forward side of the table, the illumination unit behind the table may possibly be incapable of providing sufficient amount of light. In another proposed device, an arm or the like is used to hold an illumination unit such that the illumination unit can illuminate substantially entire surface of a table. The arrangement, however, lacks portability and thus cannot be directly adopted for practical purposes.

SUMMARY OF THE INVENTION

An object of the present invention is to solve the above problem with the prior art and thereby to provide a technique of assuring sufficient amount of light from an illumination unit even when an imaging location of a video camera on a table surface is changed.

In order to solve at least part of the above problem, the present invention provides an imaging apparatus that, in picking up images of an imaging target on a table by using a video camera that is attached in the vicinity of a leading end of a video camera supporting member, inclines the video camera supporting member to the table and thereby changes an imaging location of the video camera on the table surface. The video camera supporting member uses its attitude holding mechanism to hold the video camera in a specific relative attitude with respect to the table, even when the imaging location of the video camera is changed.

The imaging apparatus of the present invention uses an illumination unit to illuminate the table. When the imaging location of the video camera on the table surface changes with the inclination of the video camera supporting member, the illumination unit uses an illumination location changeable module to change a spot to be illuminated by the illumination unit in compliance with the change of the imaging location. This arrangement assures sufficient amount of light for any imaging location irrespective of the change of the imaging location of the vide camera on the table surface. The arrangement can thereby reduce unevenness of brightness in picked up images due to shortage of light, even when the video camera continuously picks up a plurality of images while changing the imaging location.

One way of changing the illumination spot of the illumination unit in compliance with the change of the imaging location of the video camera is to change the illumination spot at two extreme imaging locations that can be taken by the video camera by means of the video camera supporting member, more specifically, at an imaging location that is most distant from the table surface and at an imaging location that is closest to the table surface. An alternative way of changing the illumination spot is to change the illumination spot continuously in compliance with the change of the imaging location of the video camera as the imaging location varies between the above-mentioned two extreme imaging locations.

A further alternative way of changing the illumination spot is to cause the illumination spot to approach the base unit of the video camera supporting member as the video camera supporting member gets less inclined to the table.

The imaging apparatus of the present invention described above can be implemented in a variety of aspects. For example, the illumination spot changeable module may be attached to the video camera supporting member, and a link mechanism, which operates in compliance with the inclination of the video camera supporting member, may be used to change an orientation of an illumination module. This arrangement advantageously facilitates the change of the illumination spot in compliance with the imaging location.

Alternatively, the illumination unit may include a first illumination module, which changes the illumination spot by the illumination spot changeable module, and a second illumination module, and may also use the second illumination module to illuminate the table. This arrangement advantageously improves effectiveness in preventing shortage of light.

Further alternatively, the second illumination module may be configured to face toward the imaging location of the video camera when the video camera is held by the video camera supporting member at a position that is relatively distant from the table surface. This arrangement effectively assures sufficient amount of light even when images are picked up by the video camera that is relatively distant from the table surface.

In this case, the second illumination module may be configured to be in a turned-off state when the video camera is held by the video camera supporting member at a position that is relatively close to the table surface. This arrangement has the following advantages.

When images are picked up by the video camera that is located relatively close to the table surface, light from the second illumination module in a light-up state may possibly be reflected by the table surface and may have an adverse effect in picking up images by the video camera. The above-described arrangement, however, can advantageously avoid deterioration of the picked up images due to the reflected light.

DESCRIPTION OF THE EMBODIMENTS

Figure 1:
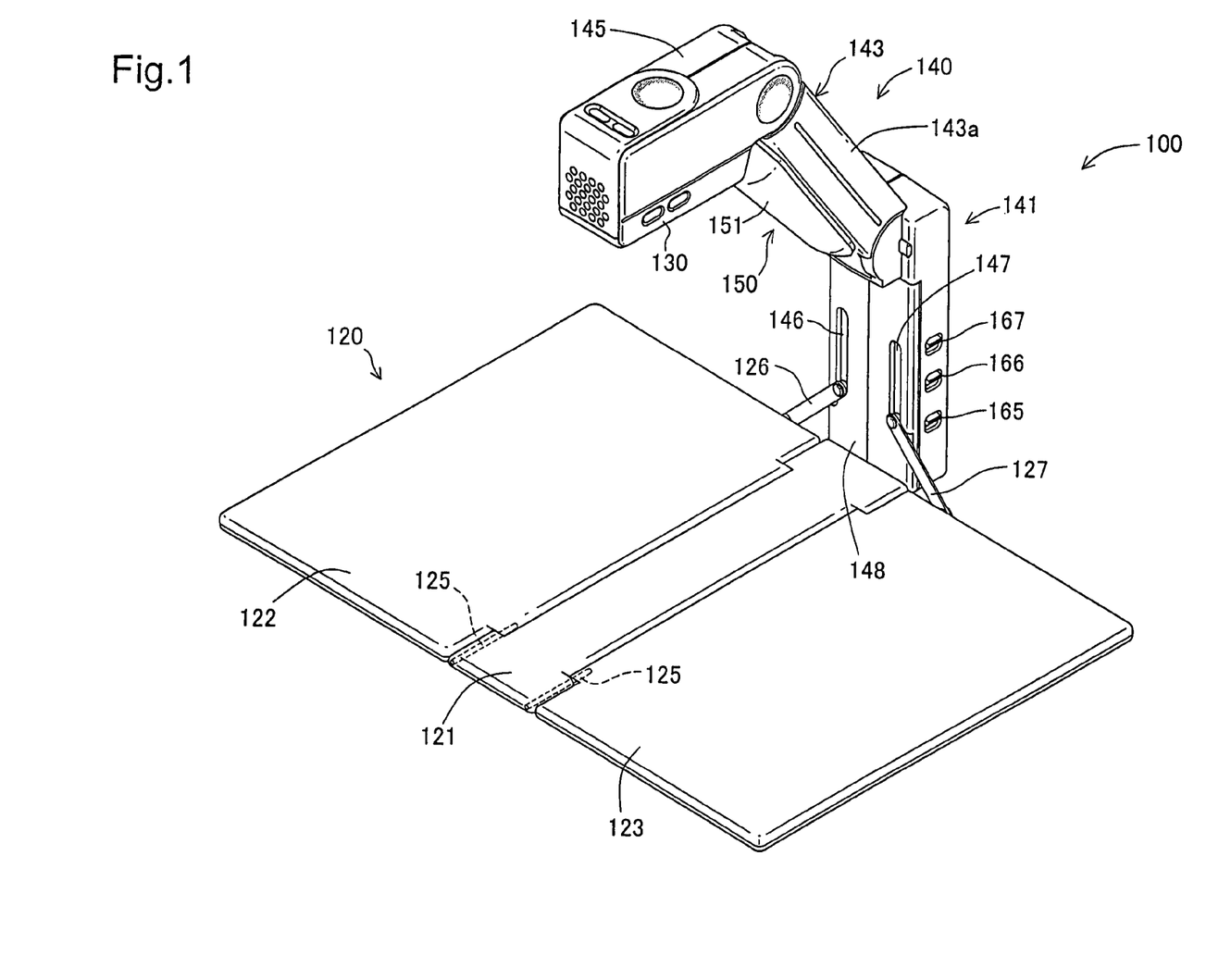
FIG. 1 is an oblique perspective view that shows an imaging apparatus 100 in a state of use as an embodiment.
Figure 2:
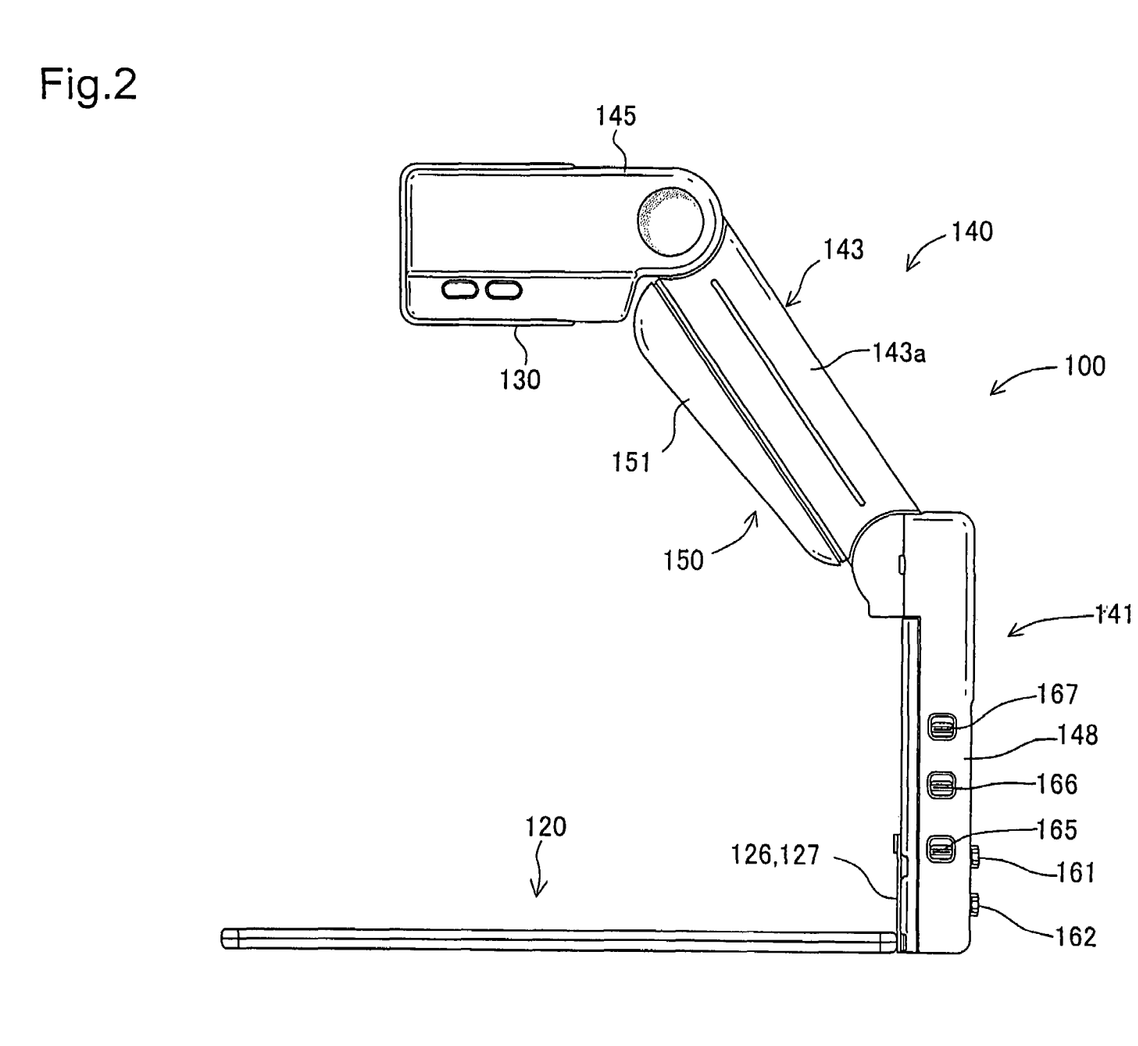
FIG. 2 is a side view of the imaging apparatus 100.
Figure 3:
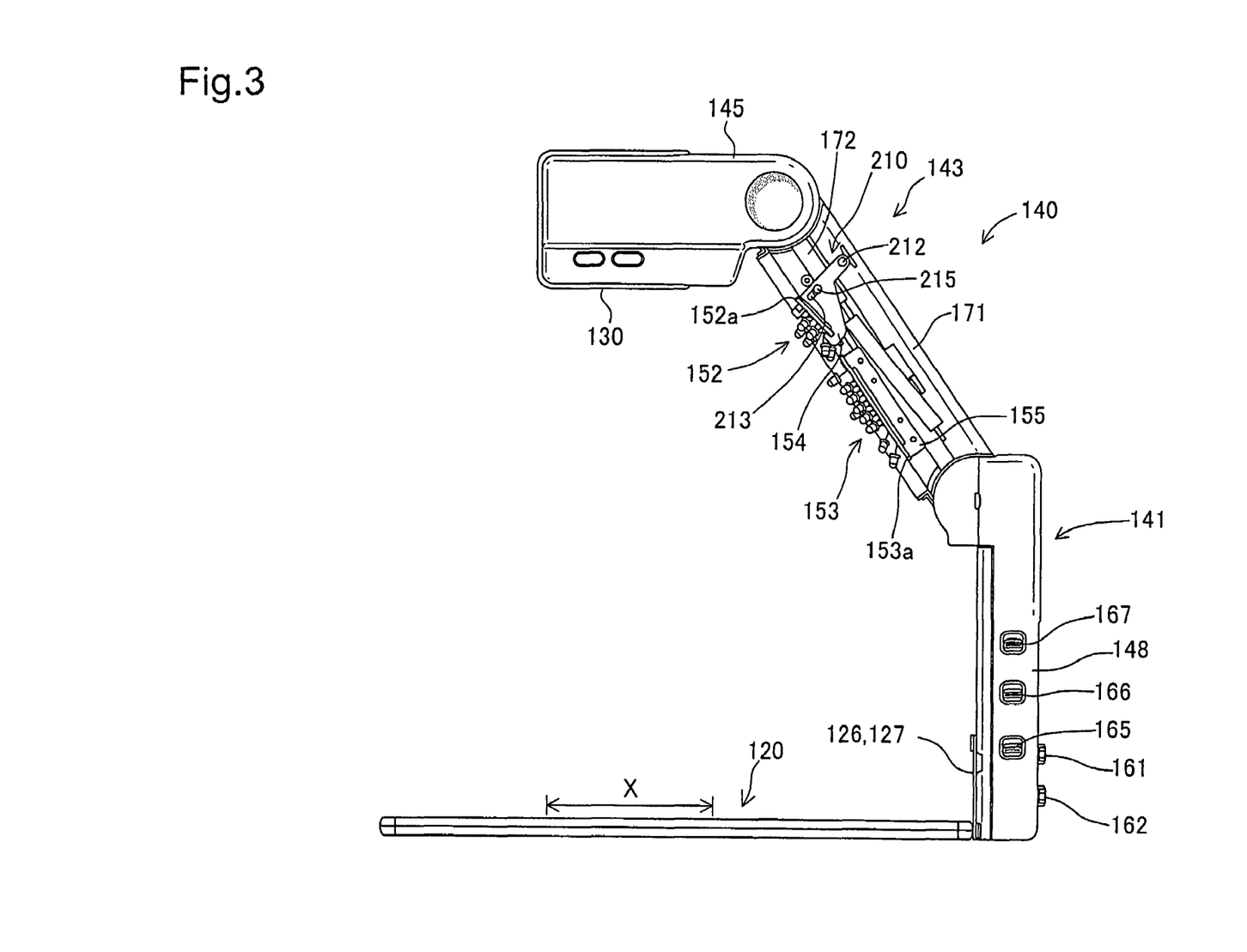
FIG. 3 is a side view of the imaging apparatus 100 with an arm in an inclined attitude and with an illumination cover and an arm cover removed.
Figure 4:
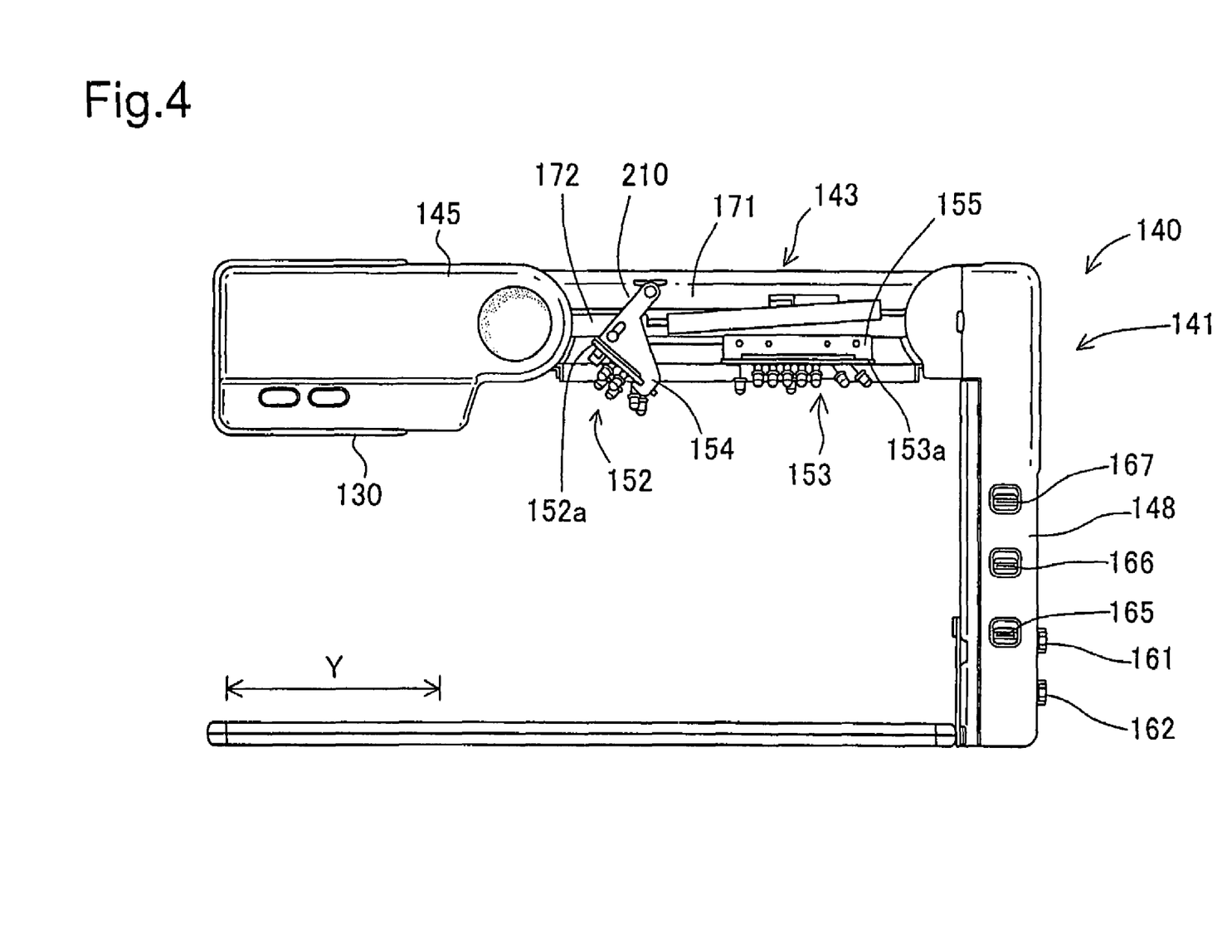
FIG. 4 is a side view of the imaging apparatus 100 with the arm held in a horizontal attitude and with the illumination cover and the arm cover removed.

The following describes preferred modes for embodying an imaging apparatus of the present invention on the basis of examples. FIG. 1 is an oblique perspective view that shows an imaging apparatus 100 in a state of use as an embodiment. FIG. 2 is a side view of the imaging apparatus 100. FIG. 3 is a side view of the imaging apparatus 100 with an arm in an inclined attitude and with an illumination cover and an arm cover removed; and FIG. 4 is a side view of the imaging apparatus 100 with the arm in a horizontal attitude and with the illumination cover and the arm cover removed. As shown, the imaging apparatus 100 includes: a table 120 that has an area larger than a A4 paper; and a camera supporting member 140 that has a video camera 130 mounted on its leading end.

First of all, the configuration of the table 120 is described. The table 120 includes: a fixed member 121 that is fixed at a lower end of the camera supporting member 140; and two flap members 122, 123 that are rotatably supported on both sides of the fixed member 121. Each of the fixed member 121 and the flap members 122, 123 is made of a thin plate of synthetic resin that has a metal plate for reinforcement (not shown) fixed on an underside, although not shown in these side views. Either side of the fixed member 121 has a concave portion of a predefined length, in which a convex portion of corresponding one of the flap members 122, 123 is fitted. Each of the fitting places has a penetrating hole in which a rotating axis 125 is inserted, which makes the flap members 122, 123 to be rotatable about the fixed member 121.

Connecting bars 126, 127 for regulating flap motions of the flap members 122, 123 are disposed on sides of the flap members 122, 123 that are close to the camera supporting member 140. Each of the connecting bars 126, 127 is rotatably attached with a screw on the edge of corresponding one of the flap members 122, 123.

The camera supporting member 140 mainly includes: a base unit 141 that is connected to the fixed member 121; an arm unit 143 that is rotatably connected to the base unit 141; and a camera holding member 145 that has the video camera 130 fixed thereto and is rotatably connected to the arm unit 143. The base unit 141 includes a coupling member 148 that is mechanically coupled with the fixed member 121. The coupling member 148 stores therein electric circuits or the like that will be described later. The coupling member 148 has two vertical grooves 146, 147 side by side on a side that faces the table 120. Each of the vertical grooves 146, 147 has a link member fitted therein, which is attached to one end of corresponding one of the connecting bars 126, 127.

The arm unit 143 includes an illumination unit 150 on a side that opposes the table 120. The illumination unit 150 has an illumination cover 151 and groups of illumination LED that will be described later. The illumination cover 151 is attached to a cover 143a that forms an outer appearance of the arm unit 143. The illumination cover 151 is a white-colored dispersive cover that disperses highly directive light from the light emitting diodes.

The illumination unit 150 has a first group of illumination LED 152 that is disposed close to the camera holding member 145 and a second group of illumination LED 153 that is disposed close to the coupling member 148. The first group of illumination LED 152 includes a plurality of LED (light emitting diodes) arranged in a matrix on a LED board 152a. The LED board 152a is supported by a bracket 154. This arrangement allows each LED to swing together with the LED board 152a. The swing motion will be described later.

The second group of illumination LED 153 includes a more number of LED than the first group of illumination LED 152 arranged in a matrix on a LED board 153a. The LED board 153a is fixed on a link member 172 that constitutes the arm unit 143. The link member 172 will be described later. When the camera supporting member 140 moves the video camera 130, more specifically, when the arm unit 143 inclines to the table 120, the second group of illumination LED 153 illuminates a spot that corresponds to the attitude of the link member 172.

That is to say, when the arm unit 143 is in an attitude that is most inclined to the table 120, as shown in FIG. 3, the second group of illumination LED 153 can emit light toward an imaging location where the video camera 130 in this attitude intends to pick up images. However, when the arm unit 143 is in an attitude that is substantially parallel to the table 120, as shown in FIG. 4, the second group of illumination LED 153 faces the table 120 at a position that is close to the coupling member 148 and distant from an imaging location where the video camera 130 in this attitude intends to pickup images. The emission of light in this case will be described later.

As shown in FIG. 3, the coupling member 148 has an input connector 161 and an output connector 162 for inputting and outputting image signals on a back face and also three switches 165 to 167 on a side face. The input connector 161 is disposed above the output connector 162 by reason that when the imaging apparatus 100 is used, a signal cable is always connected to the output connector 162 whereas no signal cable is connected to the input connector 162 in some cases.

The three switches from top down are: a power switch 165 for powering on or powering off the imaging apparatus 100; a lamp switch 166 for turning on or turning off the first group of illumination LED 152 and the second group of illumination LED 153; and a select switch 167 for selecting video signals. The select switch 167 selects either image signals that are picked up by the video camera 130 of the imaging apparatus 100 or video signals that are input into the input connector 161, as the video signals to be output to the output connector 162.

Figure 5:
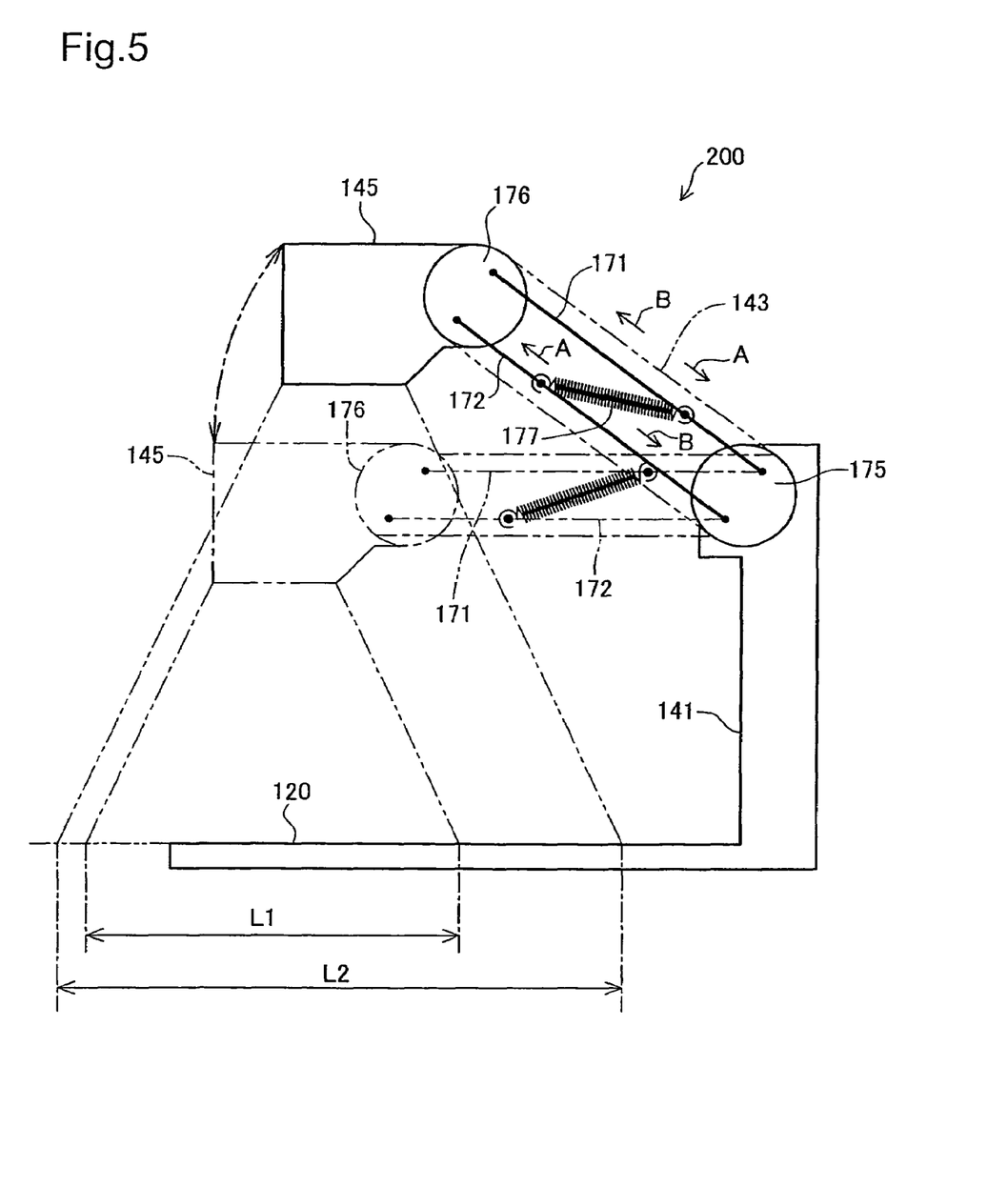
FIG. 5 is a schematic diagram that is used to describe an inclination of an arm unit 143 and an aspect of a link mechanism 200.

The following describes the link mechanism 200 that causes the inclination of the arm unit 143 and an aspect of the swing motion of the first group of illumination LED 152. The link mechanism 200 is described first. FIG. 5 is a schematic diagram that is used to describe the inclination of the arm unit 143 and a aspect of the link mechanism 200.

The link mechanism 200 is incorporated inside of the cover 143a of the arm unit 143 and includes a circular supporting member 175 that is disposed close to the base unit 141, a circular supporting member 176 that is disposed close to the camera supporting member 145, and two link members 171, 172 that span across these supporting members 175, 176. Each of the link members 171, 172 is rotatably attached to the supporting member 175 on the base unit 141 and the supporting member 176 on the camera supporting member 145. The supporting member 175 is fixed to the base unit 141 and thus does not rotate; whereas the supporting member 176 is rotatably supported by a rotation axis (not shown) disposed in the arm unit 143. The camera supporting member 145 is fixed to the supporting member 176. A coil spring 177 spans across the link member 171 and the link member 172. The coil spring 177 is used to reduce load in the course of manually moving the camera supporting member 145.

When the camera supporting member 145 is manually moved, the link mechanism 200 operates as follows to hold the camera supporting member 145 and thus the video camera 130 in their respective attitudes. That is to say, when the camera supporting member 145 moves downward from the use position shown in FIG. 1 and FIG. 5, the two link members 171, 172 rotate about their attached points on the supporting member 175. At this time, the other end points (end points on the supporting member 176) of the link members 171, 172 keep the same relative position. This is based on a principle that in a parallelogram that is formed by the link members 171, 172 and the supporting members 175, 176, moving three sides while fixing the remaining one side keeps the side opposing the fixed side parallel to the fixed side. The camera supporting member 145 that is fixed to the supporting member 176 thus keeps the same attitude as previous to the movement. Since the absolute position of the supporting member 176 changes as the camera supporting member 145 moves, which in turn moves the arm unit 143 correspondingly, it turns out that the supporting member 176 rotates clockwise about the rotation axis in the arm unit 143.

FIG. 4 shows the camera supporting member 145 in a lowest and most inclined position with respect to the table 120. The state is shown by chain double-dashed lines in FIG. 5. In this state, the arm unit 143 and the camera supporting member 145 are approximately in alignment, and the arm unit 143 is approximately orthogonal to the base unit 141 and approximately parallel to the table 120. Since a single focus lens is used for the video camera 130 in the present embodiment, the video camera 130 can pick up a material or the like on the table 120 with clarity even when it is in the lowest position shown in FIG. 4. In other words, as the camera supporting member 145 inclines deeply to the table 120 and changes its attitude from the one shown in FIG. 1 to the one shown in FIG. 4, the above-described link mechanism 200 changes the imaging location of the video camera 130 on the table surface while maintaining the relative attitude of the video camera 130 to the table 120 irrespective of the change of the imaging location. This process not only changes the imaging location of the video camera 130 but also reduces an area to be imaged by the video camera 130, as shown in FIG. 5. The change of the area to be imaged due to the change of the positional relationship of the video camera 130 to the table 120, is diagrammatically shown as imaging areas L1, L2 in FIG. 5. As can be seen, the change of the imaging area of the video camera 130 having a single focus lens results in enlargement or reduction of the imaging area.

Figure 6:
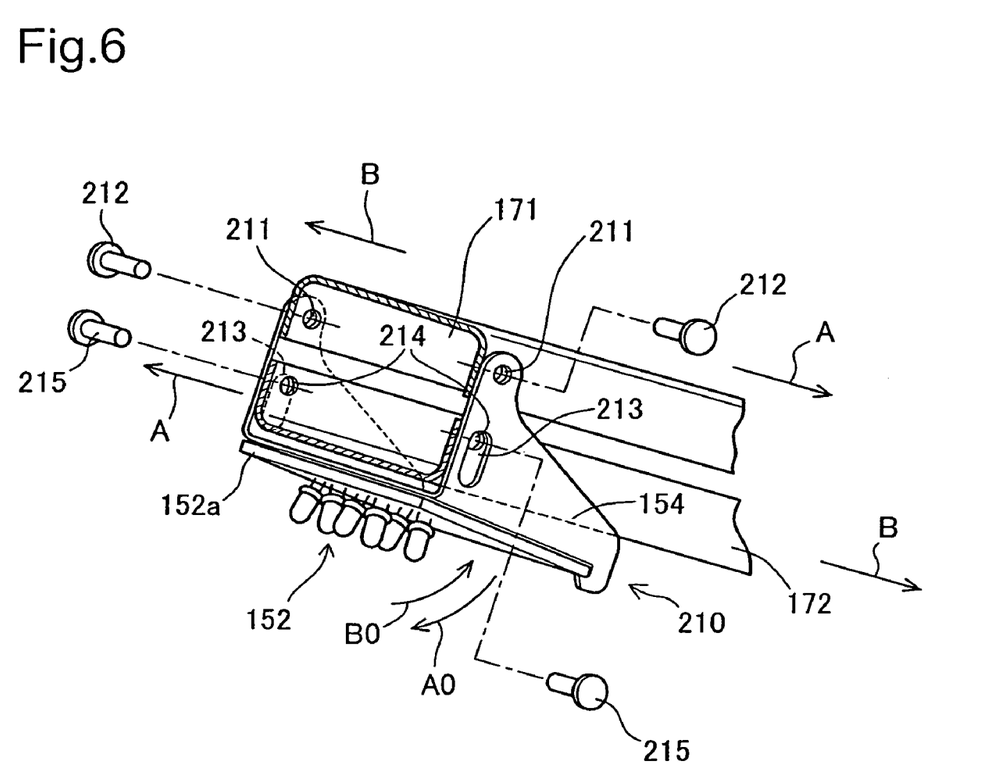
FIG. 6 is a schematic diagram that describes an illumination link mechanism 210 that cause a swing motion of a first group of illumination LED 152 and an aspect of the swing motion of the first group of illumination LED 152.

The following describes an aspect of the swing motion of the first group of illumination LED 152 that occurs in conjunction with the inclination of the arm unit 143, which is caused by the link mechanism 200. FIG. 6 is a schematic diagram that describes an illumination link mechanism 210 that causes the swing motion of the first group of illumination LED 152 and an aspect of the swing motion of the first group of illumination LED 152.

As shown in FIG. 6, the illumination link mechanism 210 is comprised in collaboration with the link members 171, 172 that constitute the link mechanism 200. The illumination link mechanism 210 engages a bracket 154 and the link member 171 by inserting a pin 212 into through holes 211 that are respectively formed in the bracket 154 and the link member 171. The illumination link mechanism 210 also engages the bracket 154 and the link member 172 by inserting a pin 215 into a long hole 213 that is formed in the bracket 154 and a through hole 214 that is formed in the link member 172. These engagements allow the bracket 154 to have a swing motion with the pin 212 in the through hole 211 as its supporting point, over a range in which the pin 215 is relatively movable along a longitudinal direction of the long hole 213.

As shown in FIG. 3, when the arm unit 143 is less inclined to the table 120 and forms a steepest slope against the table 120, and the video camera 130 takes an attitude for imaging that is most distant from the table surface, the first group of illumination LED 152 takes an attitude that faces a location on the table surface opposed by the video camera 130, i.e. an imaging spot X (see FIG. 3), and illuminates the imaging spot X. At this time, the bracket 154 has the pin 215 in the uppermost position in the long hole 213. As the arm unit 143 inclines from this position to a position that is parallel to the table 120, the link members 171, 172 operates in a way indicated by arrows A, as is evident from the schematic diagram of FIG. 5.

In this process, the pin 215 that moves with the link member 172 pushes the bracket 154 at peripheries of the long hole 213 in a way to move its relative position in the long hole 213 toward a lower end of the long hole 213. The bracket 154, accordingly, swings in a direction such that a lower end of the bracket 154 moves toward the table 120, as indicated by an arrow A0 in FIG. 6. This causes the first group of illumination LED 152 to illuminate a spot on the table surface that is opposed by the video camera 130 when the arm unit 143 is approximately parallel to the table 120, i.e. an imaging spot Y (see FIG. 4). When the arm unit 143 recovers the attitude shown in FIG. 3, the link members 171, 172 move in directions that are indicated by arrows B in FIG. 5 and FIG. 6, and cause the bracket 154 to swing back to the original position as indicated by an arrow B0. This causes the first group of illumination LED 152 to illuminate the imaging spot X (see FIG. 3) described above.

Although the link mechanism 200 is provided as a pair in the present embodiment, it may alternatively be provided as two continuous pairs to configure the arm unit 143 in a doglegged shape. In this way, the horizontal shift associated with the vertical motion can be adjusted without restraint, even to zero, for example. In this case, the illumination link mechanism 210 with the above-described bracket 154 can be incorporated into either pair of the link mechanism 200.

When the arm unit 143 takes the attitude shown in FIG. 4, the right and left flap members 122, 123 can be lifted up to configure the imaging apparatus 100 in a box-like shape, which is suitable for storage and repository.

Figure 7:
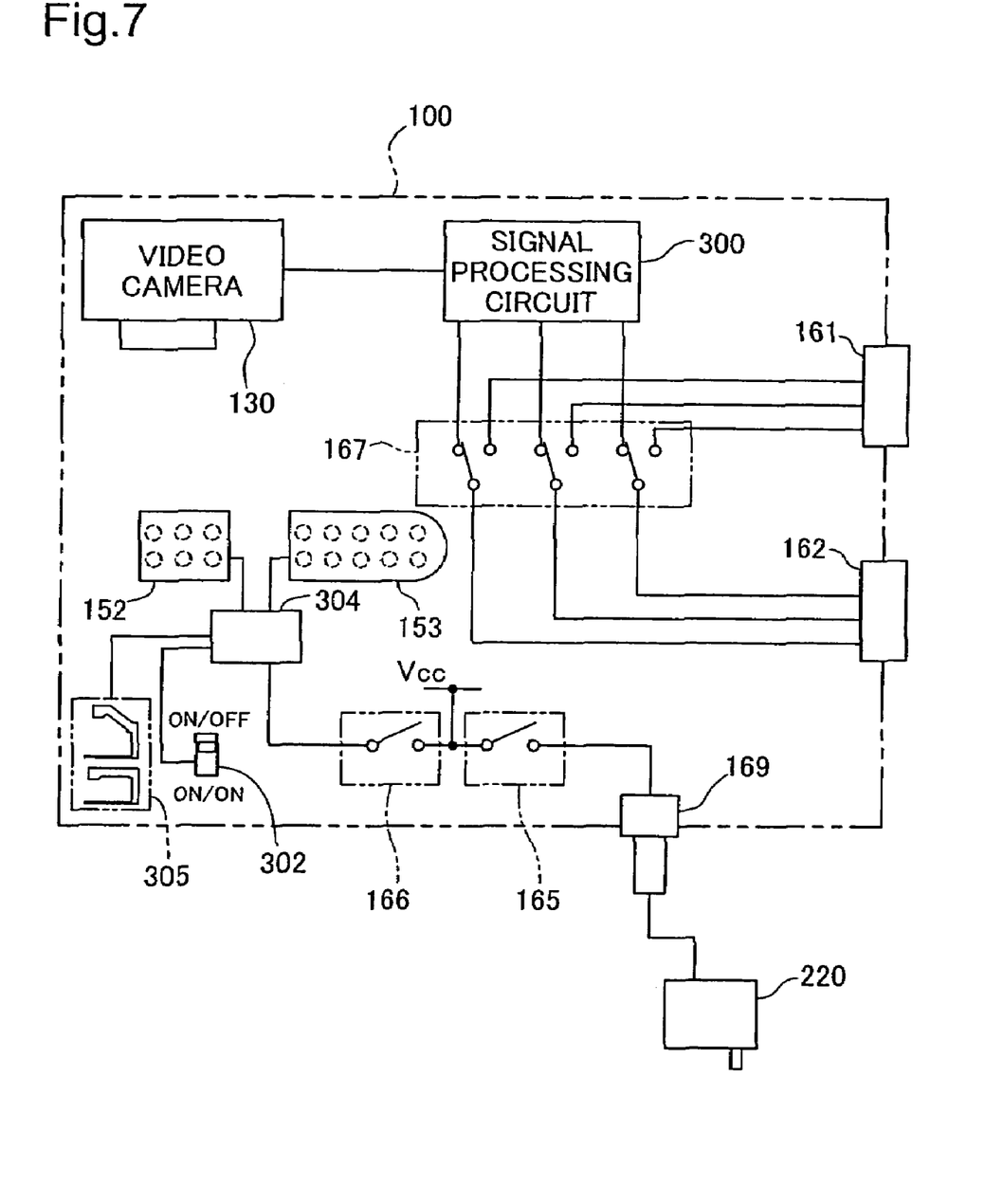
FIG. 7 is a block diagram that shows the electrical configuration of the imaging apparatus 100.

The following describes an aspect of illumination in the imaging apparatus 100 and the electrical configuration of the imaging apparatus 100. FIG. 7 is a block diagram that shows the electrical configuration of the imaging apparatus 100. As shown in FIG. 7, the imaging apparatus 100 includes a signal processing circuit 300 that processes imaging signals from the video camera 130 and outputs the signals in the form of RGB signals. The signals output from the signal processing circuit 300 connect to a group of contacts to which a select switch 167 can be switched; whereas signals from the input connector 161 connect the other group of contacts to which the select switch 167 can also be switched. In addition, a common group of contacts in the select switch 167 connects to the output connector 162. Manipulating the select switch 167, accordingly, can select either the image signals from the signal processing circuit 300 or the image signals input from the input connector 161 and output the selected signals to the output connector 162.

Furthermore, a power supply line is wired inside of the imaging apparatus 100 to supply power Vcc, which is supplied from the power supply unit 220 via a power connector 169, through a power switch 165. The material representation unit 100 is thus configured not to operate unless the power switch 165 is turned on, even though the power supply unit 220 is connected to the power connector 169. When the power switch 165 is turned on, the image signals (the image signals that are imaged by the video camera 130, for example) from the contacts (generally the contacts that are connected to the signal processing circuit 300) to which the select switch 167 is switched are output to the output connector 162. Furthermore, turning on a lamp switch 166 can light up the first group of illumination LED 152 and the second group of illumination LED 153.

The power supply line has the lamp switch 166 and an illumination control circuit 304 connected thereto, and beyond them, the first group of illumination LED 152 and the second group of illumination LED 153 are also connected separately. A dip switch 302 is a switch that is set by user and is used to switch between two illumination modes of the groups of illumination LED.

The dip switch 302 switches between an ON/ON illumination mode in which both the first and second groups of illumination LED 152, 153 are turned on irrespective of the imaging attitude of the video camera 130 (FIG. 3 and FIG. 4) and an ON/OFF illumination mode in which the first and second groups of illumination LED 152, 153 are selectively turned on and/or turned off according to the imaging attitude of the video camera 130. The dip switch 302 outputs a signal that corresponds to either one of these illumination modes to the illumination control circuit 304.

When the video camera 130 takes an imaging attitude that is most distant from the top surface of the table 120, as shown in FIG. 3, the ON/OFF illumination mode turns on both of the first and second groups of illumination LED 152, 153. The ON/OFF illumination mode, however, turns off the second group of illumination LED 153 and only turns on the first group of illumination LED, when the video camera 130 takes an imaging attitude other than the one described above, more specifically, when the video camera 130 changes its attitude from the one shown in FIG. 3 to the one shown in FIG. 4 or when the video camera 130 takes the imaging attitude of FIG. 4.

For the purpose of such switch-over between the illumination modes, the imaging apparatus 100 includes a sensor 305 that determines the imaging attitude of the video camera 130. For example, a proximity switch may be provided on the supporting member 175 shown in FIG. 5 and may be turned on or off according to the attitude of the link member 171. More specifically, the proximity switch may be turned on by the link member 171 only when the arm unit 143 holds the video camera 130 in a position that is most distant from the table surface. In this way, the proximity switch may be turned off as the arm unit 143 recovers from the attitude. The illumination control circuit 304 is thus configured to ON/OFF control the first and second groups of illumination LED 152, 153 in the following way, according to the sensor output from the sensor 305 such as the proximity switch and the illumination mode that is previously set by the dip switch 302.

Now suppose the ON/ON illumination mode is set by the dip switch 302. In this case, the illumination control circuit 304 lights up both the first and second groups of illumination LED 152, 153 irrespective of the sensor output from the sensor 305, that is to say, irrespective of which imaging attitude, such as those shown in FIG. 3 and FIG. 4, the video camera 130 takes.

On the other hand, suppose the ON/OFF illumination mode is set by the dip switch 302, the illumination control circuit 304 lights up both of the first and second groups of illumination LED only when the video camera 130 is determined to take the imaging attitude of FIG. 3 that is most distant from the table surface, based on the sensor output from the sensor 305. As the video camera 130 recovers from the imaging attitude of FIG. 3 due to the change of inclination of the arm unit 143, more specifically, as the arm unit 143 starts inclining toward the horizontal position, the illumination control circuit 304 reads the change of attitude off the sensor output from the sensor 305 and turns off the second group of illumination LED 153 and only lights up the first group of illumination LED 152.

The above-described imaging apparatus 100 of the present embodiment has the following advantages.

The imaging apparatus 100 of the present embodiment can incline the arm unit 143 to the table 120 by using the link mechanism 200. The imaging apparatus 100 varies the extent of inclination to change the imaging attitude of the video camera 130 between a faraway imaging attitude (see FIG. 3) that is most distant from the table surface and a nearby imaging attitude (see FIG. 4) that is most close to the table surface. This arrangement allows the video camera 130 to pick up images not only at each of the imaging attitudes described above but also at the change of the imaging attitudes.

When the imaging attitude of the video camera 130 is changed as above, the imaging apparatus 100 uses the illumination link mechanism 210 incorporated in the link mechanism 200 to cause the swing motion of the first group of illumination LED 152 and changes the spot to be illuminated by the first group of illumination LED 152 in compliance with the change of the imaging location of the video camera 130, which changes the imaging attitude. In the imaging apparatus 100 of the present embodiment, accordingly, sufficient amount of light can be assured for any imaging location of the video camera 130 irrespective of the change of the imaging location on the table surface as shown in FIG. 3 and FIG. 4. Accordingly, the arrangement of the present embodiment can reduce unevenness of brightness in picked up images due to shortage of light, even if the video camera 130 continuously picks up a plurality of images while changing the imaging location.

In the present embodiment, the above-described compliant motion of the first group of illumination LED 152 can be implemented by the illumination link mechanism 210 incorporated in the link mechanism 200 without any particular electrical driving device for the compliance. Therefore, this arrangement allows for simpler configuration and more cost effectiveness.

The imaging apparatus 100 includes the second group of illumination LED 153 in addition to the first group of illumination LED 152. The second group of illumination LED 153 illuminates an illumination spot that corresponds to the imaging location of the video camera 130 in the faraway imaging attitude that is most distant from the table surface (the imaging spot X in FIG. 3). Accordingly, this arrangement can avoid with certainty the shortage of light for picking up images at this attitude.

Additionally, when the video camera 130 takes an attitude other than the above-described faraway imaging attitude, the second group of illumination LED 153 is turned off through the setting of the dip switch 302. This arrangement prevents the light that is radiated from the second group of illumination LED 153 and is reflected by the table surface to enter the video camera 130 when the video camera 130 takes the nearby imaging attitude that is close to the table surface. Accordingly, this arrangement can avoid problems such as deterioration of images due to the reflected light.

Although the present invention has been described in terms of several embodiments, the present invention is not restricted to the above embodiments, but there may be many modifications, changes, and alterations without departing from the scope or spirit of the main characteristics of the present invention. The present invention, therefore, is not limited by the specific disclosure herein. For example, the imaging apparatus of the present invention is not only applicable to the material representation device but may alternatively be applicable to other devices such as a camera for calligraphic works and paintings. The video camera is not restricted to the one mounted with a single focus lens but other types of cameras such as the one mounted with a zoom lens may alternatively used.

Although the illumination mode is set through the use of the dip switch 302 in the above embodiment, only one mode i.e. ON/OFF illumination mode may alternatively used.

Although the above embodiment has been described in terms of the imaging apparatus with the flap up table 120 having the flap members 122, 123, the present invention may alternatively be applied to other types of imaging apparatus such as the one with a tabular table, as long as the imaging location of the video camera 130 can be changed according to the inclination of the arm unit 143. Additionally, although the camera supporting member 140 has the base unit 140 fixed to the table and the arm unit 143 in the above embodiment, the present invention may alternatively be applied to an imaging apparatus in which one arm unit that is inclinable to a table is attached to a table-fixed base.

What is claimed is:

1. An imaging apparatus including a table for receiving an imaging target and a video camera operable to pick up images from a direction of the table, the imaging apparatus comprising:
   a video camera supporting member including a leading end configured to hold the video camera and a base, the video camera operable to pick up images of the imaging target mounted on the table;
   a first illumination device positioned on the video camera supporting member above the base at a location of the video camera, and configured to illuminate the table; and
   a second illumination device positioned at the base of the video camera supporting member and configured to illuminate the table;
   wherein the video camera supporting member includes:
   an attitude holding mechanism configured to be inclinable to the table to a degree of inclination with respect to the table to change an imaging location of the video camera on the table surface, and when the imaging location is changed, to hold the video camera at a relative attitude with respect to the table,
   wherein the first illumination device includes:
   an illumination spot changeable module configured to change an illumination spot to be illuminated according to the imaging location, the imaging location changing with the inclination of the video camera supporting member, and
   wherein the second illumination device is positioned to illuminate the table so that the second illumination device turns to the imaging location of the video camera when the video camera by means of the video camera supporting member is turned to an imaging location most distant on the table surface, and the second illumination device is in a turned-off state when the video camera by means of the video camera supporting member takes an imaging location that is closest to the table surface.

2. The imaging apparatus in accordance with claim 1, wherein the illumination spot changeable module changes an orientation of the first illumination device.

3. The imaging apparatus in accordance with claim 2, wherein the illumination spot changeable module includes a link mechanism that operates in compliance with the inclination of the video camera supporting member, and uses the link mechanism to change the orientation of the first illumination device.

* * * * *

UNITED STATES PATENT AND TRADEMARK OFFICE
CERTIFICATE OF CORRECTION

| | |
|---|---|
| PATENT NO. | : 7,576,768 B2 |
| APPLICATION NO. | : 10/866215 |
| DATED | : August 18, 2009 |
| INVENTOR(S) | : Kazuhiro Sukenari |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1469 days.

Signed and Sealed this

Seventh Day of September, 2010

David J. Kappos
*Director of the United States Patent and Trademark Office*